W. H. STRONG.
Wheel-Cultivators.
No. 146,030.                    Patented Dec. 30, 1873.
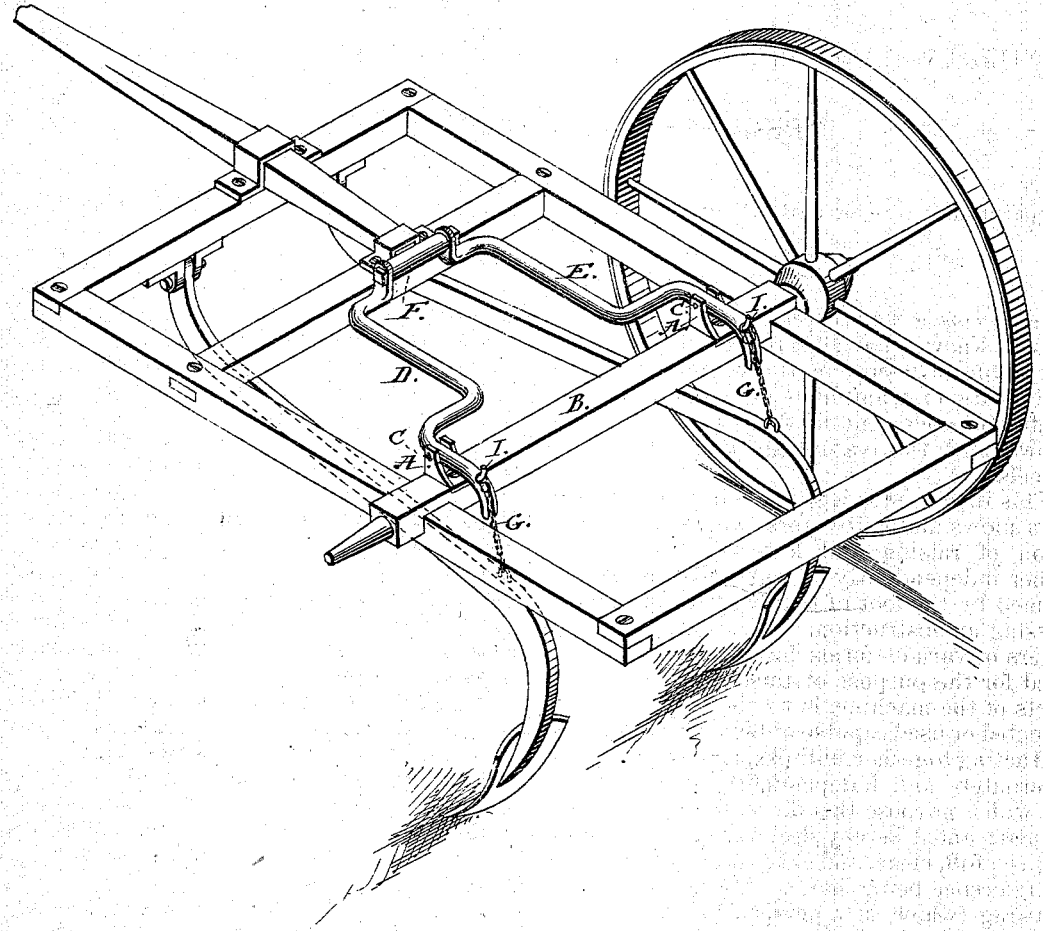
Attest;
John Gwynn
Alexander Pew
Inventor;
Wm. H. Strong

UNITED STATES PATENT OFFICE.

WILLIAM H. STRONG, OF CLINTON TOWNSHIP, SENECA COUNTY, OHIO.

IMPROVEMENT IN WHEEL-CULTIVATORS.

Specification forming part of Letters Patent No. 146,030, dated December 30, 1873; application filed May 19, 1873.

*To all whom it may concern:*

Be it known that I, WILLIAM H. STRONG, of Clinton township, in the county of Seneca and State of Ohio, have invented a new and useful Improvement in that class of Shovel-Plows and Cultivators that are carried on wheels.

This invention is a specific improvement in corn plows and cultivators, whereby the operation of raising and lowering the shovels, either independently or together, can be performed by the foot of the driver at the time of passing an obstruction. I am aware that foot-levers of various forms have been heretofore used for the purpose of raising the operative parts of the machine, but none have been constructed or used capable of being rigidly joined and acting together, or the separate parts raised alternately and independently of each other, for which purpose this device is especially designed; and I hereby declare that the following is a full, clear, and exact description thereof, reference being had to the accompanying drawing (which is a perspective view of the same) and to the letters of reference marked thereon.

I attach the two lugs A A to the top side of the axle-tree B, as shown, and through the lugs A A and the levers D and E pass the fulcrum pins or bolts C, for the purpose of supporting the said cranked levers D and E thereon, respectively. The rear ends of the levers D and E are joined together by the bar F, which passes through suitable holes formed in the rear ends of said levers, and is secured firmly by a nut on each end, at the outside thereof. The levers D and E are to be so connected when used on a cultivator, and are to be detached when in use on a corn-plow, whereby the driver is enabled to use either lever to raise the right or left hand gang of shovels, as he may desire. The chain G is attached to the plow-shovel frame in any convenient manner, and passes upward over the curved ends of the levers D and E, lying in the slotted recess formed for its reception, and are then hooked onto the hooks I I, which are securely fastened through the levers D and E, respectively, and can thereby be changed so as to raise the shovels to any desired height.

Having thus described my said invention, I expressly disclaim any and every other part of the plow or cultivator than those described.

What I do claim, and desire to secure by Letters Patent, is—

In a wheel-cultivator, the lugs A A, cranked levers D E, bar F, chain G, and hooks I I, arranged and attached in the manner described, and for the purpose hereinbefore set forth.

In witness whereof I hereunto set my hand.

WM. H. STRONG.

Witnesses:
 JOHN GWYNN,
 ALEXANDER PEW.